Aug. 10, 1965  M. D. BENNETT ETAL  3,199,795

MIXING MACHINE

Filed Jan. 21, 1963  2 Sheets-Sheet 1

INVENTORS.
RICHARD D. BENNETT
MARVIN D. BENNETT
BY
Christie, Parker & Hale
ATTORNEYS.

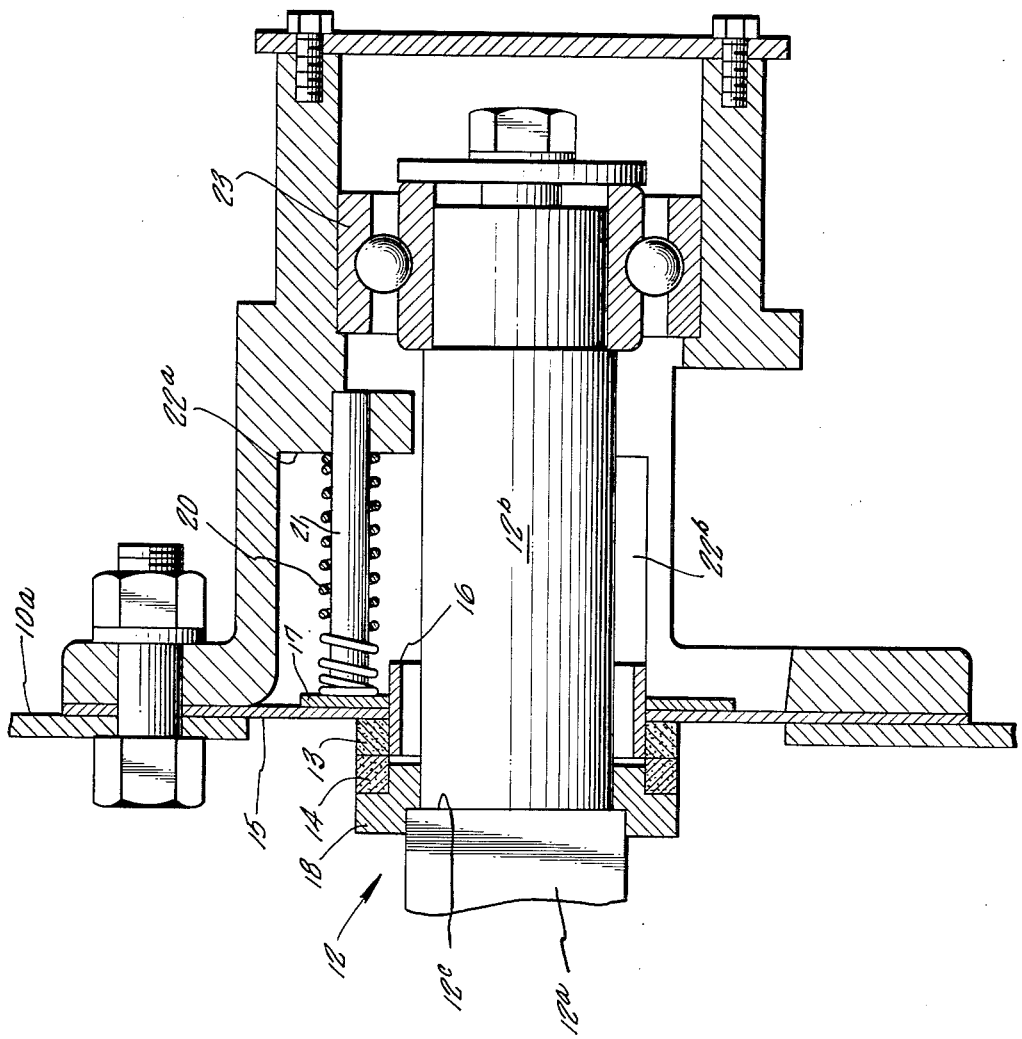

United States Patent Office 3,199,795
Patented Aug. 10, 1965

3,199,795
MIXING MACHINE
Marvin D. Bennett, Manhattan Beach, and Richard D. Bennett, Pasadena, Calif., assignors to Royal Industries, Inc., Pasadena, Calif., a corporation of California
Filed Jan. 21, 1963, Ser. No. 252,976
7 Claims. (Cl. 241—101)

This invention relates to mixing machines particularly adapted for handling mixtures including abrasive materials or particles therein such as mixing machines for plasters, sands, and the like and, more particularly, to a shaft seal for these types of mixers.

The mixing machines that are presently available for handling plasters, sands, and the like comprise a mixing bowl in which the materials to be mixed are stored and a shaft extending through the mixing bowl mounts mixing blades or a paddle wheel. Generally these materials are mixed in a semi-fluid state and it is evident that they include abrasive materials. The abrasive particles have been found to travel along the mixing shaft and to lodge themselves between the shaft and the shaft seal whereby the continuous operation of the machine with the abrasive particles lodged in this fashion allows the abrasive particles to act like a sandpaper or grinding wheel whereby the shaft is severely damaged or broken. Each of the shaft seals then that are presently employed on the mixing machines and/or are commercially available for such applications have to be maintained regularly in order to avoid the maintenance problems associated therewith and/or the shaft breakage. Accordingly, at the present time there is no commercially available mixing machine and/or shaft seal available that avoids the problems of shaft breakage.

The present invention provides an improved shaft seal particularly adapted for use with a mixing machine for mixing materials having abrasives therein wherein the maintenance of the seal is reduced to a minimum and eliminates the problem of shaft breakage. The shaft seal of the invention is simple in structure, easy to assemble and disassemble, inexpensive, and is unaffected by vibration or twisting moments inherent in machine operation. The shaft seal is constructed of materials that are very hard, at least as hard as the materials being mixed, whereby any abrasive materials that lodge themselves in the shaft seal, and particularly between these hard surfaces, are ground to form a harmless paste. Although shaft seals constructed of such hard materials are commercially available, they are principally designed for use with liquids, gases, or fluids that do not have any abrasive particles therein. Accordingly, such seals are not adaptable for use in a mixing machine.

Structurally, the present invention comprises a mixing machine having a mixing bowl and a mixing shaft extending through the bowl, and the shaft seal is mounted on the inside of the mixing bowl adjacent an end wall thereof. The shaft seal principally comprises a pair of rings constructed of a very hard material having mating surfaces ground to a fine polish within microinch tolerances, and supported and spaced around the shaft for relative rotation to secure the two ground surfaces together. In one particular embodiment the rings consist of tungsten carbide. Accordingly when any abrasive materials travel along the mixing shaft during the operation of the machine and are lodged between the carbide rings they are ground to a very fine paste and leave both the rings and the shaft in an undamaged condition as they travel out of the mixing bowl into the bearing housing. The bearing housing may be further defined with an aperture to allow the materials traveling along the mixing shaft to be passed out of the housing by means of gravity. Furthermore in maintaining such a shaft seal upon observance of the paste forming in the bearing housing the seal may be readily purged by passing water over the seal to cleanse the ground surfaces of the rings.

These and other features of the present invention may be more fully appreciated when considered in the light of the following specification and drawings, in which:

FIG. 3 is a cross-sectional view of the improved shaft seal as assembled with the machine of FIG. 1.

Figure 1:
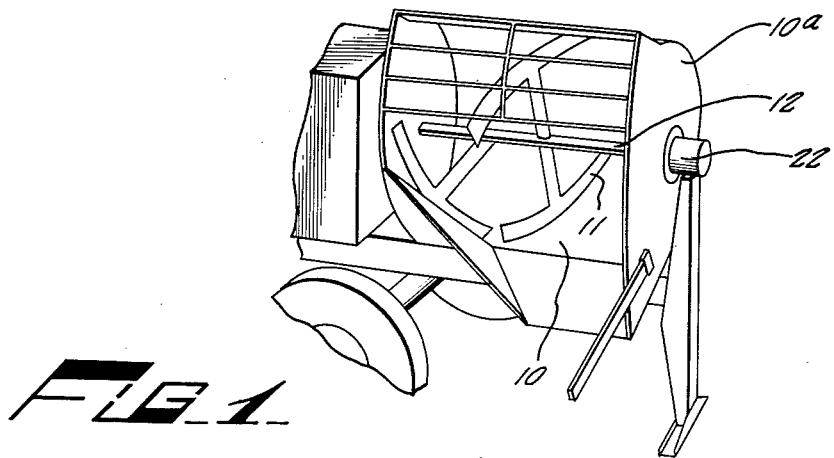
FIG. 1 is a partial perspective view of a mixing machine embodying the invention.

Now referring to the drawings, the invention will be described as it may be applied to a mixing machine for mixing plaster and cement and preferably mixing these materials in a semi-fluid state. The materials to be mixed are stored in the mixing bowl 10 of the machine and are mixed by means of the mixing blades or paddles 11 mounted to be rotatable with the mixing shaft 12 as is conventional. The mixing shaft as illustrated extends through at least one end wall of the mixing bowl 10 and which outer wall 10$^a$ has the shaft seal and bearing secured thereto. During the operation of the machine the materials in the mixing bowl may traverse along the mixing shaft 12 and into the bearing for the shaft 12 resulting in damage to either the shaft or the bearing, and it is the function of the shaft seal to prevent the passage of fluids or the abrasives therealong.

The shaft seal of the present invention comprises sealing ring means constructed of a pair of sealing rings 13 and 14. The sealing rings 13 and 14 are constructed of a very hard material and preferably a material as hard or harder than the materials, particularly the abrasive materials, to be mixed in the mixing bowl 10. In one particular embodiment of the invention the sealing rings 13 and 14 are constructed of a tungsten carbide for use in a plaster mixing machine. These sealing rings have their mating surfaces 13$^a$ and 14$^a$ ground to a very fine, mirror-like polish sufficient to seal off any fluid tending to flow along the mixing shaft 12. In the particular embodiment employing tungsten carbide rings, for example, these mating surfaces 13$^a$ and 14$^a$ were ground to a smoothness of 16 microinches. It is an important aspect of the present invention to select a material for the sealing rings 13 and 14 not only from the standpoint of the material being sealed or tending to flow along the mixing shaft but the material must be such that upon relative rotation of the sealing rings 13 and 14 the mating surfaces 13$^a$ and 14$^a$ will not be scored whereby their sealing property is destroyed. Tungsten carbide has been found to have this property and, in addition, upon relative rotation of the sealing rings 13 and 14 any abrasive particles tending to lodge themselves between the sealing surfaces 13$^a$ and 14$^a$ are ground to a harmless paste.

Now referring to FIG. 3 the assembly of the shaft seal of the present invention with a mixing machine will be examined. The mixing shaft 12 may be of conventional construction whereby the portion carrying the mixing blades 11 may be of a square construction and which square portion is identified by the reference numeral 12$^a$. The outer extension of the mixing shaft 12 is of a round configuration and which extension is identified by the reference numeral 12$^b$. The shaft portion 12$^b$ is of a reduced dimension from the portion 12$^a$ whereby a shoulder 12$^c$ is defined between the square portion 12$^a$ and the round portion 12$^b$ at which shoulder the shaft seal is located. The sealing ring 13 is arranged to be the stationary ring of the shaft seal and is secured to a flexible diaphragm 15 which is, in turn, secured to the side wall of the mixing bowl 10$^a$. The diaphragm 15 is preferably constructed of a material which is chemically inert to the material undergoing mixing and of sufficient flexibility to allow the sealing ring 13 to be maintained in alignment with the cooperating face of the sealing ring 14 during the rotation of the latter sealing element. A material that has been found to be satisfactory for use as the diaphragm 15 is neoprene.

Figure 2:
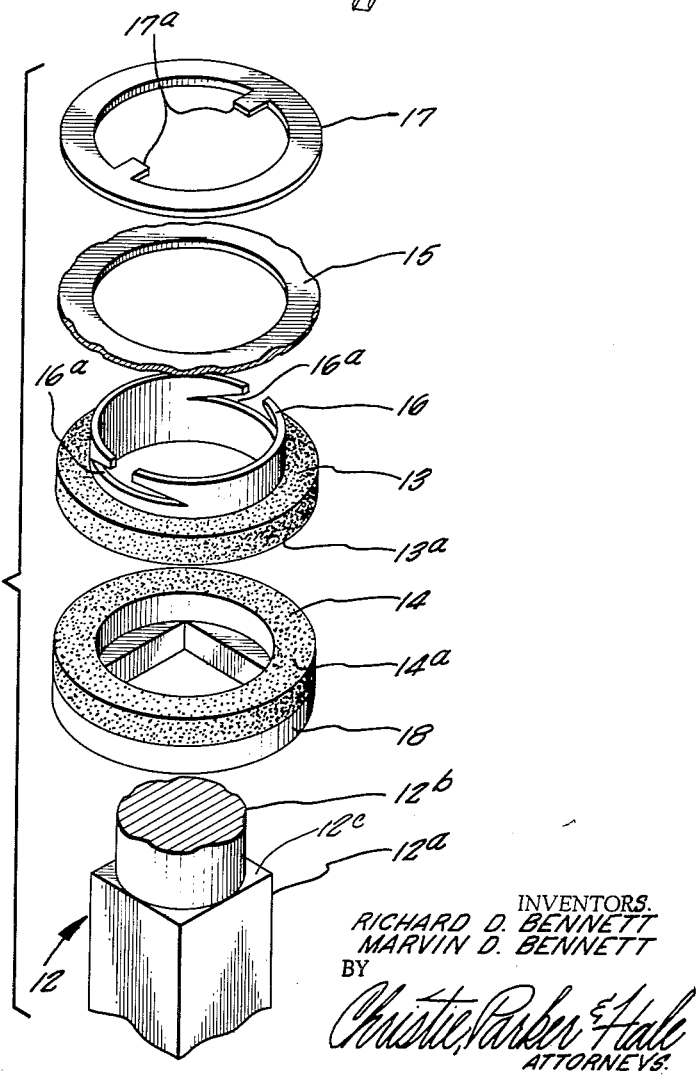
FIG. 2 is an exploded view of the improved shaft seal.

The detailed construction of securing the sealing ring 13 in a fixed and an aligned position about and spaced from the shaft portion 12$^b$ can be best appreciated from an examination of FIG. 2. It will be therein noted that the face opposite the sealing face 13$^a$ of the sealing ring 13 is provided with a retaining ring 16 that may be either mechanically secured and/or cemented to the sealing ring 13. This retaining ring 16 is secured to the inner face of the sealing ring 13 and is defined with a diameter relative to the diameter of the shaft portion 12$^b$ to maintain the sealing ring 13 spaced from the shaft 12. The retaining ring 16 is further defined to extend outwardly of the sealing ring 13 for mounting a locking washer 17, as will be more evident hereinafter. The retaining ring 16 is further defined with a pair of similarly constructed, diametrically opposed locking slots 16$^a$, as best seen in FIG. 2. When assembled, the sealing ring 13 is maintained in a stationary position by securing the locking washer 17 to the retaining ring 16 through the provision of the locking ears 17$^a$ for the washer 17. The locking ears 17$^a$ are similarly defined and diametrically opposed to be accepted into the locking slots 16$^a$. The retaining washer 17 is secured through the positioning of the locking ears 17$^a$ into the locking slots 16$^a$ and rotating the locking washer 17 to a locking position or to locate the locking ears 17$^a$ in the reduced portion of the slots 16$^a$. This relative rotation of the retaining ring 16 and the locking washer 17 should be in a direction opposite to the rotation of the mixing shaft 12 whereby the rotation of the shaft tends to lock these elements tighter together during operation of the machine.

The sealing ring 14 is mounted to and carried by a drive socket 18 which is adapted and constructed to be positioned around the square portion 12$^c$ of the mixing shaft 12 and, accordingly, is defined to accommodate the portion 12$^a$ adjacent the shoulder 12$^c$ and is reduced in dimension to accommodate the round portion of the shaft 12$^b$. The drive socket 18 may be constructed of cast aluminum. The outer end of the drive socket 18 is reduced to accept the sealing ring 14 whereby the outer faces of the ring and socket are flush and the ring 14 is positioned in a coaxial relationship with the sealing ring 13. The sealing ring 14 is mechanically secured and/or cemented to the drive socket 18. The drive socket 18 then will be seen to be rotatable with the mixing shaft 12 and rotates the sealing ring 14 therewith while the sealing ring 13 is maintained in a stationary position.

In order to provide the desired sealing action through the use of the sealing rings 13 and 14, a preselected amount of pressure must be maintained between the sealing elements. To this end, the pressure is applied to these elements by means of a spring 20 mounted on a rod 21 whereby the spring 20 is seated between the shoulder 22$^a$ for a bearing housing 22 and the retaining washer 17, as illustrated. It should be understood that a plurality of springs 20 may be utilized to maintain the correct distribution of pressure on the sealing rings 13 and 14 and to properly position the diaphragm 15. For use with a mixing machine handling abrasives the amount of pressure should be on the order of 50–90 pounds for proper operation.

The end of the shaft 12 is journaled in the usual fashion through the provision of a bearing 23 mounted at the end of the shaft portion 12$^b$ and housed within the bearing housing 22 as illustrated. The bearing housing 22 is secured to the end wall 10$^a$ of the mixing bowl and may be secured by the same fastener securing the diaphragm 15 thereto.

It should now be evident that the material being handled by the mixing machine is prevented from flowing through the shaft seal of this invention by the ground mating surfaces 13$^a$ and 14$^a$ of the sealing rings. These sealing rings 13 and 14 provide a sufficiently tight joint that neither abrasives or fluids may readily travel along the shaft 12. In the event any material or fluid is passed along the shaft 12 it is either ground to a harmless paste by the action of the sealing rings while the machine is in motion and the paste and/or fluid is allowed to travel out of the housing 22 by gravity through the provision of the housing opening 22$^b$. Any paste or materials that accumulate in the bearing housing may be readily washed out without affecting the shaft seal.

It should also be recognized that the shaft 12 extends through the other end of the mixing bowl 10 and a shaft seal is provided at that end as well.

What is claimed is:

1. A shaft seal for a rotatable shaft comprising a pair of sealing rings constructed of a material harder than any material to which the shaft is to be exposed, one of the adjacent surfaces of each of the rings being ground flat to preselected mircroinch tolerances to eliminate any air gap between the polished surfaces when the adjacent surfaces are mounted on a rotatable shaft to be sealed, means for resiliently mounting one of said sealing rings in a stationary sealing position with respect to a shaft and yet follow the movements of the shaft, means for mounting the other sealing ring in a sealing relationship with a rotatable shaft and to be rotatable with said shaft, and means for maintaining a preselected amount of pressure on said sealing rings to maintain them in an aligned sealing relationship and yet allow the resiliently mounted ring to continuously seal against the other ring.

2. A seal for use in abrasive environments and the like comprising a shaft having ends exposed to abrasive like materials, bearing means mounted on the shaft and spaced from the ends exposed to the abrasive materials, a pair of housings adapted to enclose the bearing ends of said shaft to protect said ends from the abrasive environment, a pair of sealing rings spaced around said shaft adjacent each of the abrasive exposed ends thereof, said rings being constructed of a very hard material defined to be effective to grind to paste form any material including abrasive materials that travel along the shaft to the abrasive exposed ends, and are lodged between the rings without wearing each other, one of said rings of each pair being flexibly secured to the housing while the other ring is adapted to be rotatable with said shaft, each of said housings being further defined with an opening between the bearing means and the sealing rings to allow any materials traveling along the shaft to pass therefrom by gravity, means for mounting each pair of the rings in a spaced and sealing relationship with said shaft, and resilient means mounted in each of said housings for continuously urging the corresponding sealing rings into intimate engagement and yet allow the flexibly mounted ring to continuously follow the rotatable ring in a sealing relationship.

3. In a mixer for handling materials including abrasive like materials having a mixing bowl, a shaft mounting mixing blades extending through the bowl for mixing materials in the bowl and extending through the end walls of the bowl, bearing means for the shaft mounted adjacent the end walls of the mixing bowl and mounted outside of the bowl, a bearing housing secured to each wall, and a shaft seal mounted on said shaft adjacent said end walls of the mixing bowl, said seal comprising a pair of carbide rings spaced about said shaft and arranged in intimate engagement, each of the engaging surfaces of said rings being ground to a fine polish with microinch tolerances, and means including flexible means for mounting and securing the rings for relative rotation in a spaced and sealing relationship with said shaft and yet maintaining the rings in a sealing relationship with the shaft movements.

4. A machine comprising a frame having a material handling bowl, a shaft extending through said bowl and in engagement with materials stored in said bowl, housing means mounted to the outside walls of the bowl, said shaft extending into the housing and mounted therein to allow relative movement between the shaft and the bowl, a pair of sealing rings spaced around and adjacent the ends of said shaft inside said bowl, each of said rings being constructed of an abrasive-like material each having at least one surface ground to a high polish to minimize the air gap between the rings when engaging one another, means for flexibly mounting each of said sealing rings to said end walls to extend into the bowl in a sealing relationship to continuously follow said shaft in a spaced relationship with said shaft, means for mounting the other of said sealing rings to be rotatable with said shaft and having its ground surface in sealing engagement with the corresponding ground surface of the coacting ring of the pair and in a sealing relationship with said shaft, yieldable means mounted in each housing for continuously holding the rings together under a preselected amount of pressure and to allow the flexibly mounted ring to continuously follow and seal against the rotatable ring whereby any abrasive material that travels between the shaft and said latter mentioned means during the operation of the machine and is lodged between the rings is ground therebetween without damage to the rings or the shaft.

5. A machine as defined in claim 4 wherein said rings consist of tungsten carbide.

6. A shaft seal for a rotatable shaft subjected to abrasive environments and the like comprising a sealing ring constructed of a material harder than any material to which the shaft is to be exposed, one of the surfaces of the ring defining a sealing surface, means for mounting the sealing ring to be rotatable with a shaft to be sealed and in a sealing relationship therewith, another sealing ring characterized as said first mentioned ring, flexible means mounting said another sealing ring about the shaft to be sealed with the sealing surface thereof in intimate engagement with the sealing surface of the other ring, said latter means being constructed and defined to maintain the sealing rings in continuous alignment including during the intervals the shaft is rotating whereby any material that is lodged between the sealing rings is ground to a harmless paste by the action of the rings thereon.

7. A shaft seal as defined in claim 6 including bearing housing means for the shaft to be sealed and wherein the sealing rings are mounted on the shaft in a position to be directly exposed to the abrasive environment and outside of the bearing housing for the shaft to seal off the housing from the abrasive environment.

References Cited by the Examiner
UNITED STATES PATENTS

| | | | |
|---|---|---|---|
| 2,480,908 | 9/49 | Davies | 277—96 |
| 2,531,079 | 11/50 | Payne | 277—96 X |
| 2,627,171 | 2/53 | Brumagim. | |
| 2,879,093 | 3/59 | Dolhun | 277—96 X |
| 2,911,240 | 11/59 | Boutros et al. | |

J. SPENCER OVERHOLSER, *Primary Examiner.*